United States Patent [19]

Frommelt et al.

[11] Patent Number: 4,805,362
[45] Date of Patent: Feb. 21, 1989

[54] HOOK SEAL FOR LOADING DOCK SHELTER

[75] Inventors: John A. Frommelt, Dubuque, Iowa; Floyd D. West, Galena, Ill.

[73] Assignee: Frommelt Industries, Inc., Dubuque, Iowa

[21] Appl. No.: 100,315

[22] Filed: Sep. 23, 1987

[51] Int. Cl.$^4$ ............................................. E04F 10/04
[52] U.S. Cl. ................................................ 52/173 DS
[58] Field of Search .................... 52/173 DS; 135/101, 135/109

[56] References Cited

U.S. PATENT DOCUMENTS

| | | |
|---|---|---|
| 2,892,463 | 6/1959 | Frommelt et al. . |
| 3,352,314 | 11/1967 | Frommelt et al. ............ 52/173 DS |
| 3,403,489 | 10/1968 | Frommelt et al. ............ 52/173 DS |
| 3,638,667 | 2/1972 | Frommelt et al. . |
| 3,875,954 | 4/1975 | Frommelt et al. ............ 52/173 DS |
| 3,915,183 | 10/1975 | Frommelt . |
| 4,003,170 | 1/1977 | Mellyn ........................... 52/173 DS |
| 4,601,142 | 7/1986 | Frommelt . |
| 4,638,612 | 1/1987 | Bennett ......................... 52/173 DS |
| 4,711,059 | 12/1987 | Layne ............................ 52/173 DS |

Primary Examiner—J. Karl Bell
Attorney, Agent, or Firm—Emrich & Dithmar

[57] ABSTRACT

A pair of vertically oriented hook seals positioned in facing relation on the lateral portions of a loading dock shelter engage the aft lateral portions of a truck or van positioned adjacent to a loading dock and seal the gap between the truck sides and its open doors. Each seal is coupled to a dock shelter side panel and extends inward toward an aperture in a wall about which the dock shelter is disposed. Each seal is comprised of a curtain having a plurality of spaced, resilient, flexible ribs or reinforcing strips disposed along the length thereof and securely coupled at their respective outer ends to a dock shelter side panel. The inner end of each of the reinforcing strips is coupled to an elongated foam strip extending substantially the full height of the dock shelter sides and having a generally triangular cross section. Each of the foam strips is adapted to engage in a sealed manner an aft lateral edge of the truck as well as the proximal edge of an adjacent open door of the truck and to fill the gap between the truck and its open door. The flexible reinforcing strips along the length of each of the curtains in combination with a collapsible support frame in each side frame allow the foam strips to fill the door/truck gap along the full height of the truck not only in the case of an inclined or declined loading dock, but also when the truck is misaligned relative to the loading dock shelter, i.e., in not "square" relative to the wall upon which the dock shelter is mounted. The hook seal arrangement is also capable of accommodating trucks having a range of widths.

19 Claims, 6 Drawing Sheets

HOOK SEAL FOR LOADING DOCK SHELTER

BACKGROUND OF THE INVENTION

This invention relates generally to loading dock shelters and is particularly directed to a lateral seal for a loading dock shelter which engages in a sealed manner the aft lateral portions of a van or truck using the loading dock.

A truck having an open rear doorway is typically backed into close positioning and in alignment with a building doorway for loading and unloading. The width of the truck body is typically the same standard width as that of the building doorway. A loading dock shelter is typically disposed about the doorway to form a seal between an aft portion of the truck and the building in order to isolate the interiors of the building and the truck from the outside environment during loading and unloading in providing an effective shelter for men and materials. These loading dock shelters afford effective sealing engagement between the shelter structure and a truck cooperatively engaged therewith. One example of such a loading dock shelter is disclosed in U.S. Pat. No. 2,892,463, assigned to the assignee of the present application.

Loading dock shelters are generally classified into two different types: (1) those embodying resilient, compressible pad members, and (2) those making use of fabric or sheet material so as to form walls or curtains. In the former type of dock shelter employing resilient pads, a truck to be loaded or unloaded is backed into abutting contact with a wall mounted arrangement of resilient pad members which provide a seal around the aft peripheral edges of the truck. In the latter type of shelter, which is typically referred to as a "drape type" loading dock shelter, walls or curtains, which consist of fabric or sheet material supported in more or less a tentlike manner, are draped around a van in sealing engagement therewith. An example of the former type of loading dock shelter can be found in U.S. Pat. No. 4,601,142, while examples of the latter type of "drape" loading dock shelter can be found in U.S. Pat. Nos. 3,638,667 and 3,915,183, all assigned to the assignee of the present application.

Regardless of how tight the seal established between the loading dock shelter and the outer periphery of the truck, where the truck has hinge-type doors the gap between the truck body and an open door allows access of the outside environment to the loading area. To date, loading dock shelters have been unable to provide a seal for the inter-hinge gap of a truck being loaded or unloaded. In addition, prior art loading dock shelters whether of the "drape" type or of the resilient pad type have been able to provide only limited sealing engagement with the periphery of a truck for both an inclined as well as a declined loading dock approach or where the truck is misaligned or off center with respect to the loading dock shelter.

The present invention overcomes all of the aforementioned limitations of the prior art by providing sealed engagement with the aft edges of the body of a truck as well as with its hinge-mounted doors so as to seal off the gap therebetween. The hook seal of the present invention is further adapted to engage in a sealed manner the aft lateral periphery of a truck using the loading dock when the truck is misaligned and/or off center relative to the loading dock for a loading dock having either an inclined or a declined approach. The loading dock shelter hook seal is further adapted to sealingly engage the aft lateral portions of trucks having a wide range of body widths.

OBJECTS AND SUMMARY OF THE INVENTION

Accordingly, it is an object of the present invention to provide an improved seal for a loading dock shelter.

It is another object of the present invention to provide sealing means for sealing the gap between the side of a truck or van and an open door pivotally coupled by a hinge thereto.

Yet another object of the present invention is to provide a seal for the gap between an open door and a side of a van using a loading dock where the van is misaligned relative to the dock shelter and a doorway in its supporting wall.

A further object of the present invention is to seal the gap between the sides of a truck and its hinged open doors for a loading dock having either an inclined or a declined approach.

This invention contemplates a hook seal for engaging the aft lateral edges of a van or truck positioned adjacent to a loading dock for sealing the gap between the truck's open doors and the sides of the truck. The hook seal includes a pair of generally facing vertically oriented curtains attached to a respective side frame of the loading dock shelter and extending inwardly toward an aperture in a wall. Disposed in a spaced manner within and along the length of each curtain are a plurality of flexible, resilient reinforcing ribs. An elongated foam strip having a generally triangular cross section is attached to the distal end of each of the reinforcing ribs and is adapted to engage an aft lateral edge of the truck as well as an adjacent edge of its open door so as to fill the gap therebetween in a sealed manner. The flexibility of the hook seal arrangement as well as its resilience and compressibility permits the hook seal to securely engage a portion of the truck and to form a seal between the truck and its open doors as well as between the open doors and the loading dock side panels whether the loading dock is level, declined, or inclined, while being capable of also compensating for misalignment between the truck and the loading dock.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
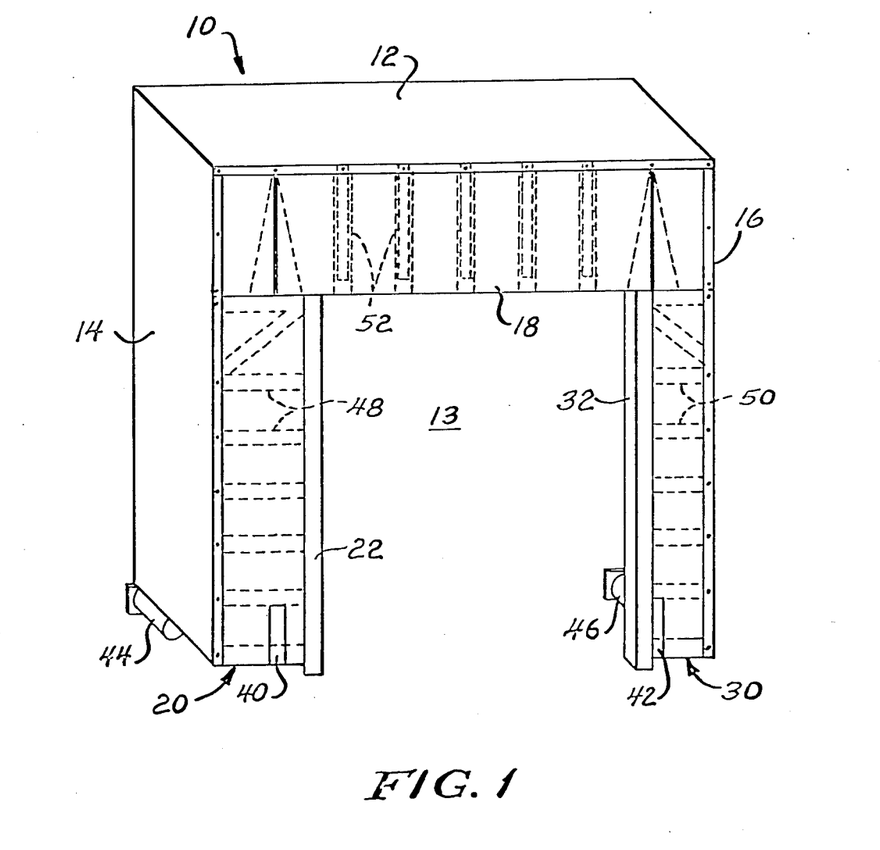
FIG. 1 is a front perspective view of a loading dock shelter incorporating a pair of hook seals in accordance with the present invention.

Referring to FIG. 1, there is shown an upper front perspective view of a loading dock shelter with hook seals 10 in accordance with the present invention. The loading dock shelter 10 includes a header panel 12 and left and right side panels 14, 16. The terms "left" and "right" are taken with the loading dock shelter 10 viewed from the front, or toward a wall upon which the loading dock shelter is mounted. This wall is not illustrated in FIG. 1 for the sake of simplicity. Each of the header and left and right side panels 12, 14 and 16 is securely attached to the support wall which includes an aperture about which the loading dock shelter is disposed. Conventional means such as mounting bolts and/or brackets may be used to affix these panels to a support wall.

The loading dock shelter 10 further includes a head curtain 18 as well as left and right side curtains 20, 30. The head curtain 18 is provided with a plurality of spaced pockets therein oriented generally transversely to the length of the head curtain. Each of these pockets is adapted to receive a respective reinforcing strip or stay 52 which are shown in dotted line form in FIG. 1. The upper end of each of the stays 52 is securely mounted to a forward or distal edge of the header panel 12 by conventional means such as screws or bolts. Each of the left and right side curtains 20, 30 is similarly provided with a plurality of pockets within each of which is positioned a respective stay 48 and 50. The outer edges of each of the left and right stays 48, 50 are adapted for secure attachment to a respective forward or distal edge of the left and right side panels 14, 16 by conventional means such as bolts or screws. The head curtains 18 as well as the left and right side curtains 20, 30 are therefore securely coupled to a forward edge of the loading dock shelter around its periphery. Securely attached to an inner edge of the left side curtain 20 is a hook seal 22, while a similar hook seal 32 is affixed to the corresponding inner edge of the right side curtain 30. The structure of each of the hook seals 22, 32 as well as the manner in which they are affixed to a respective side curtain is described in detail in the following paragraphs. Finally, left and right guide strips 40, 42 are respectively affixed to lower portions of the left and right side curtains 20, 30 and left and right guards/stop brackets 44, 46 are securely mounted to the support wall immediately beneath respective left and right lower portions of the loading dock shelter 10.

Figure 2:
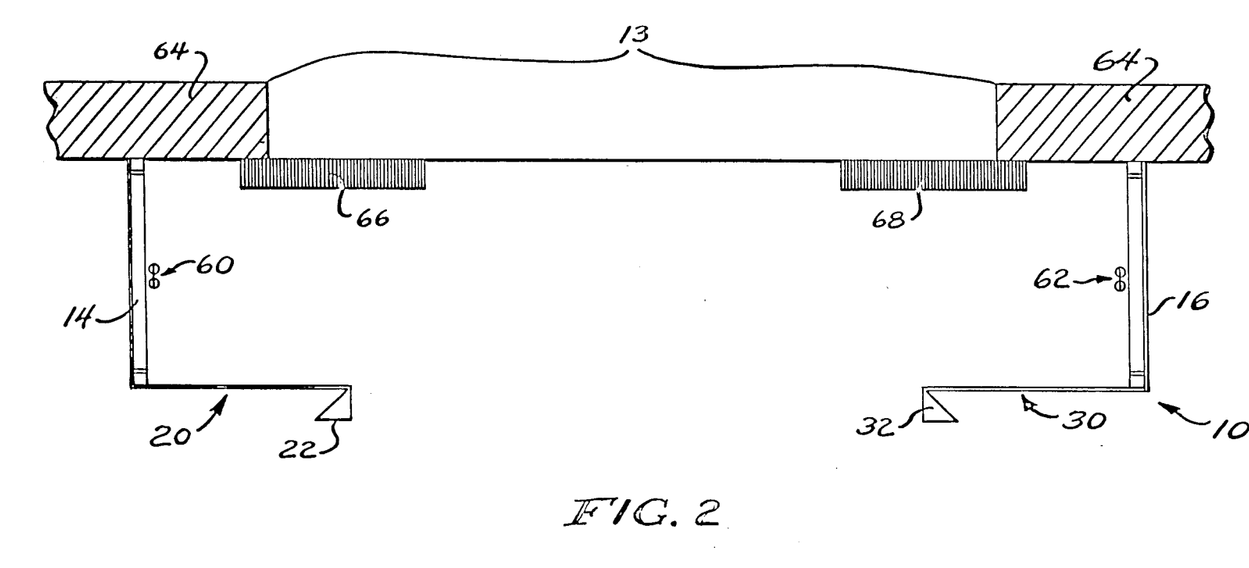
FIG. 2 is a vertical sectional view of the loading dock shelter with hook seals of FIG. 1.

Referring to FIG. 2, there is shown a horizontal sectional view of the loading dock shelter 10 illustrated in FIG. 1. The left and right side curtains 20, 30 are each securely mounted to an outer portion of the wall 64 on respective sides of an aperture 13 within the wall by means of the left and right side panels 14, 16. Each of the left and right side panels 14, 16 may be securely affixed to the wall 64 by conventional means such as mounting bolts and associated brackets which are not shown in the sectional view of FIG. 2 for simplicity.

Left and right building bumpers 66, 68 are typically affixed to the wall 64 immediately below the aperture 13 therein. The building bumpers 66, 68 are adapted for engagement by a truck (not shown in FIG. 2) using the loading dock shelter 10 as it backs into close proximity to the aperture 13 in the wall 64. Positioned within each of the left and right side panels 14, 16 is a collapsible metal frame having a pair of coil springs 60, 62, respectively. The coil springs 60, 62 maintain the collapsible metal frame in a fully extended configuration to maintain the left and right side panels 14, 16 fully extended from the wall 64 as shown in FIG. 2. Details of the construction and operation of these collapsible metal frames are described below. The left and right hook seals 22, 32 respectively positioned on the inner end portions of the left and right side curtains 20, 30 are adapted for engagement by a respective lateral aft portion of a truck using the dock shelter 10 as described in the following paragraphs.

Figures 3, 4:
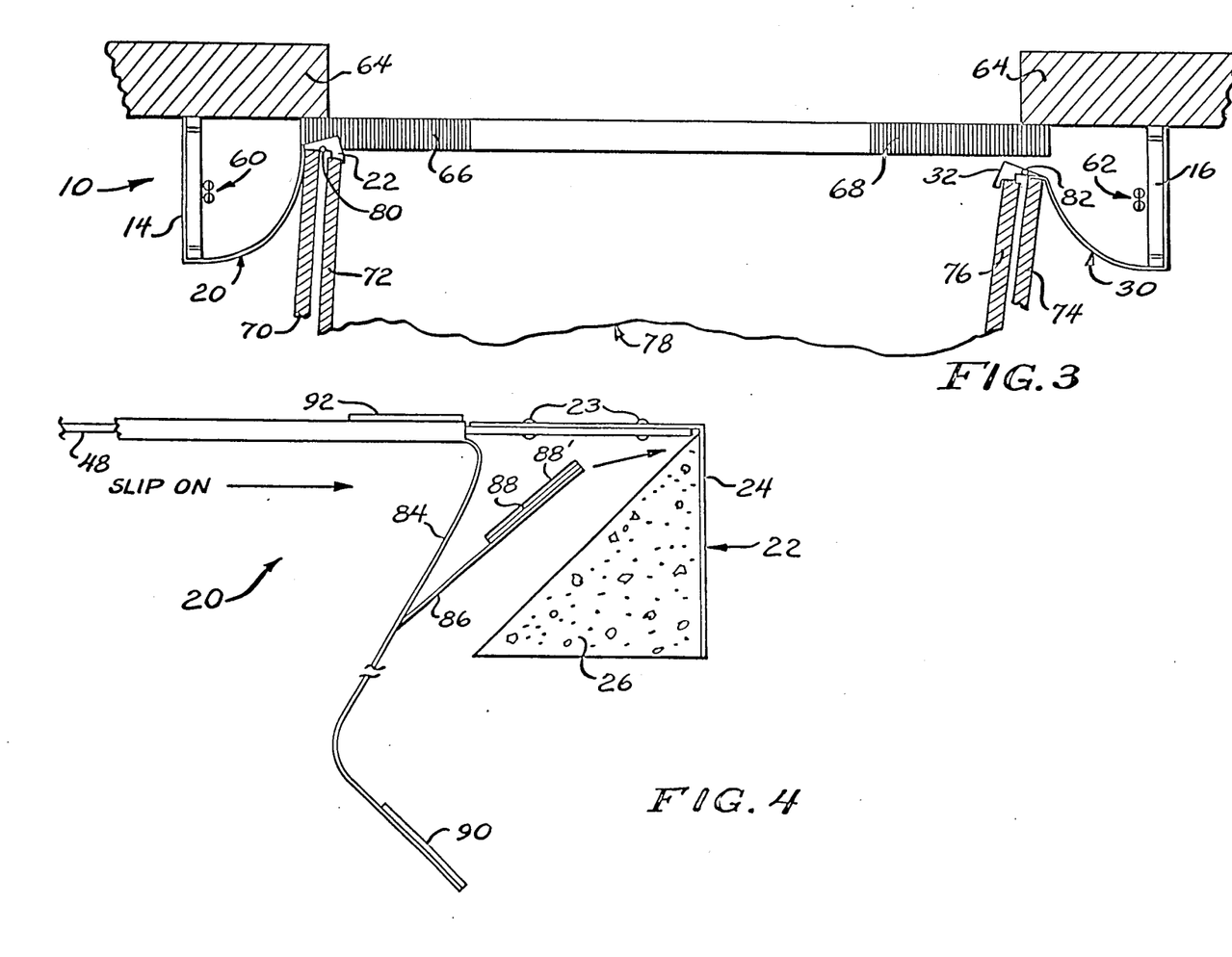
FIG. 3 is a vertical sectional view of the loading dock shelter with hook seals of FIG. 1 illustrating engagement of a truck by the hook seals.
FIGS. 4, 5 and 6 are sectional views illustrating the structure and assembly of a hook seal in accordance with the present invention.

Referring to FIG. 3, there is shown the manner in which the loading dock shelter 10 incorporating hook seals in accordance with the present invention engages in a sealed manner an aft portion of a truck or van 78. As shown in the figure, the truck 78 includes left and right walls or partitions 72, 76. Pivotally coupled to the left truck wall 72 by means of a hinge 80 is a left door 70. Similarly, pivotally coupled to the right truck wall 76 by means of a second hinge 82 is a right van door 74. The left and right truck doors 70, 74 are illustrated in the full open position in FIG. 3, but may be pivotally displaced to the closed position whereupon the two doors extend across the aperture in the aft of the truck 78.

As the truck 78 backs toward the loading dock shelter 10, the hook seal 22 engages the aft edges of the left truck door and wall 70, 72. Similarly, hook seal 32 engages the aft edges of the right truck door and wall 74, 76. Hook seal 22 thus extends across the gap between the open door 70 and the left truck wall 72. Similarly, hook seal 32 extends across the gap between the open truck door 74 and the right truck wall 76. In this manner, each of the hook seals 22, 32 seals the gap between a truck lateral wall and its associated open door in order to provide isolation for the interior of the truck 78 and the building on which the loading dock shelter is mounted from the outside environment. It should be noted that FIG. 3 illustrates the truck 78 in a position out of alignment with the loading dock shelter 10. This is illustrated in the angled orientation of the truck 78 relative to an imaginary line perpendicular to the plane of the wall 64. With a truck in misalignment with the loading dock shelter and building wall, prior art loading dock shelters are unable to provide sealed engagement with both sides of the truck. This is avoided in the present invention by the unique combination of hook seals for engaging the aft edges of the truck and flexible, resilient side curtains which allow the hook seals to remain in sealed engagement with the truck even when misaligned with the loading dock shelter.

Figure 5:
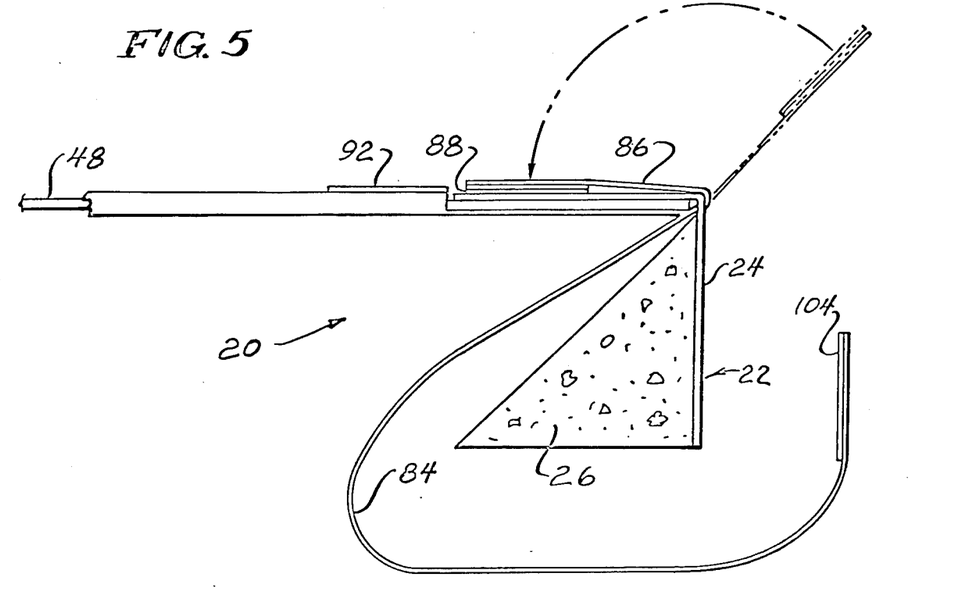
Figure 6:
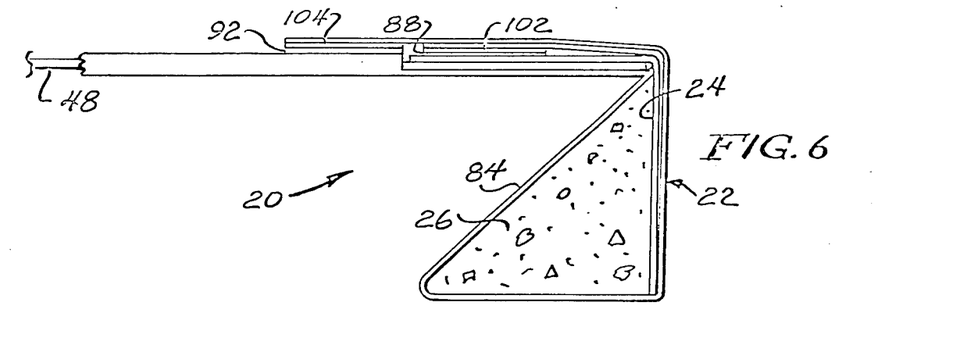
Figure 7:
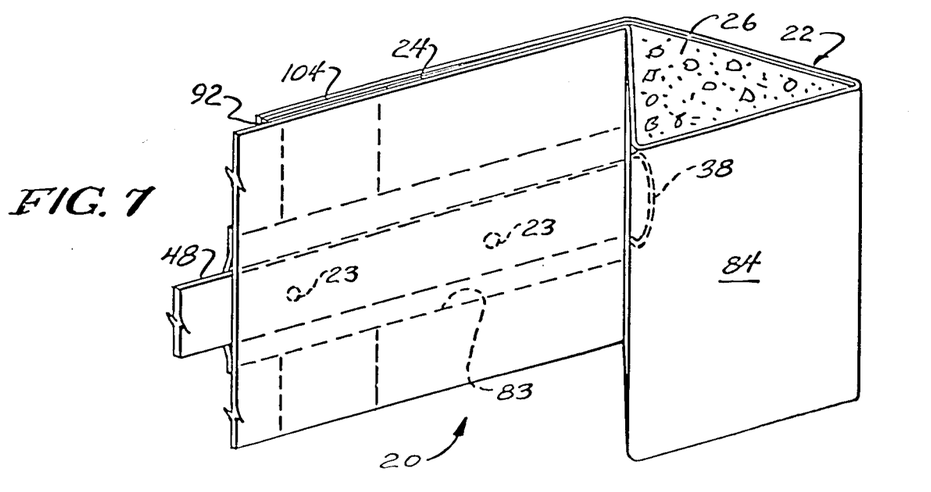
FIG. 7 is a perspective view showing further details of the hook seal of the present invention.

Referring to FIGS. 4, 5 and 6, structural details as well as the assembly of a hook seal 22 in accordance with the present invention will now be described. To the distal end of each of the stays 48 is securely coupled to generally 90° hook angle 24. A plurality of connecting pins such as semi-tubular rivets 23 are used to securely affix the hook angle 24 to a stay 48. The length of each of the left and right hook angles extends substantially the entire height of the left and right side curtains 20, 30, with each of the hook angles securely coupled to a plurality of side curtain stays as previously described. An elongated foam strip 26 having a generally triangular cross section is fastened to a distal, inner portion of the hook angle 24 by conventional fastening means such as epoxy glue. As shown in FIG. 7, the outer, or distal, portion of the hook angle 24 is provided with an aperture 38 therein. Also as can be seen in FIG. 7, each of the stays 48 is positioned within a pocket 83 of the left side curtain 20 as previously described. Each of the hook angles as well as the reinforcing strips is preferably comprised of spring steel or fiberglass.

Each of the side curtains includes a curtain extension portion 84. To the distal end of the curtain extension portion 84 is affixed a velcro hook 90. A complementary velcro loop 92 is attached to the side curtain 20 along the length thereof. To an intermediate portion of the curtain extension portion 84 is affixed such as by sewing a tab 86 having a velcro patch and loop combination 88 affixed to the distal end thereof. In assembling the curtain and hook seal combination, the tab 86 is inserted through the aperture 38 within the hook angle 22 and the curtain extension portion 84 is drawn tight by pulling the tab outward from the hook seal. An adhesive backing 88' is then removed from the velcro patch and loop combination 88 on the distal end of the tab 86 which is then affixed to an outer, proximal portion of the hook seal 24 as shown in FIG. 5. The distal end of the curtain extension portion 84 is then wrapped around the foam pad 26 and drawn tight and secured in this position by attaching its velcro hook 90 to the velcro loop 92 affixed to the side curtain 20. In this manner, the side curtain 20 is drawn tight over the stays 48 therein as well as around the combination hook angle 24 and foam pad 26 attached to the distal end of the side curtain. While the preferred embodiment of the present invention contemplates the use of velcro coupling arrangements for covering the hook seal, various other attachment approaches well known to those skilled in the art such as sewing, bonding glues, etc., could be used in carrying out the present invention. The curtain extension portion 84 of the side curtain 20 extends the full length of the side curtain so as to completely enclose the foam pad 26 and protect it from the elements.

Figure 8:
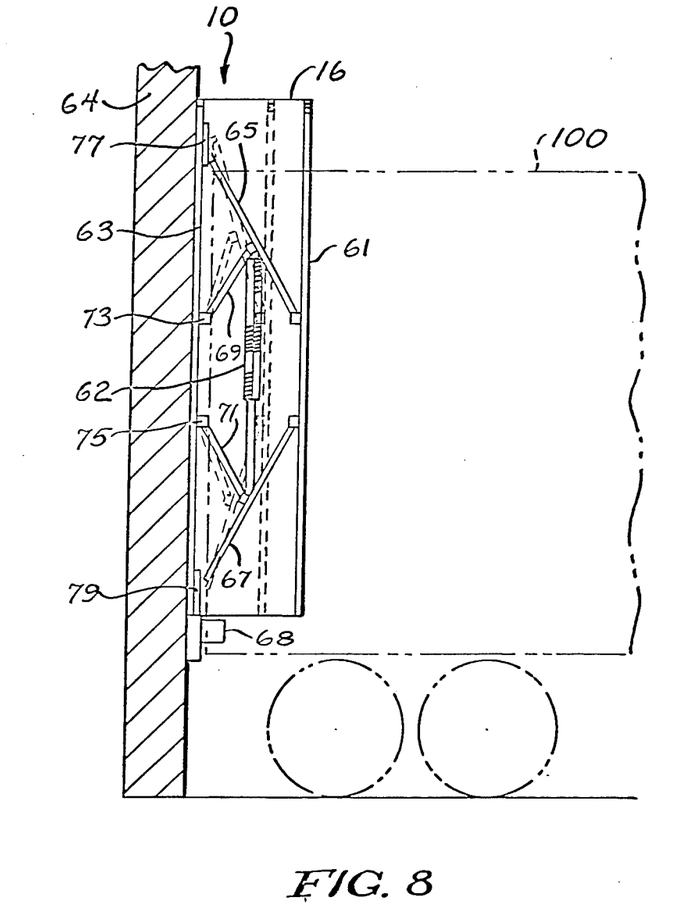
FIG. 8 is a lateral sectional view illustrating further details of a loading dock shelter incorporating hooks seals in accordance with the present invention.

Referring to FIG. 8, there is shown a truck or a van 100 engaging the loading dock shelter 10 of the present invention. Illustrated in FIG. 8 is the inner portion of the right side panel 16 showing the details of a collapsible support frame for use in the side panels of the loading dock shelter. The right side panel 16 as well as its collapsible supporting frame are shown when not engaged by a van in solid line form. When engaged by a truck 100 as shown in FIG. 8, the loading dock shelter 10 collapses toward the building wall 64 to which it is mounted. To afford this collapsing capability, each of the side panels includes a flexible cover such as of hypalon positioned over a respective colapsible support frame.

Mounted to the outer surface of the wall 64 is a generally vertically oriented support member 63. Fixedly attached to the support member 63 at an intermediate portion thereof are upper and lower coupling brackets 73, 75. The collapsible support frame further includes first and second intermediate pivot arms 69, 71. A first end of the first intermediate pivot arm 69 is pivotally coupled to the upper support bracket 73, while a first end of the second intermediate pivot arm 71 is pivotally coupled to the lower support bracket 75. Respective second ends of the intermediate pivot arms 69 and 71 are pivotally coupled to intermediate portions of upper and lower pivot arms 65 and 67. A first end of the upper pivot arm 65 is coupled to an upper sliding pivot arm hinge 77, while the second end of the upper pivot arm is coupled to a vertical support beam 61. Similarly, a first end of the lower pivot arm 67 is coupled to a lower sliding pivot arm hinge 79, while a second end of the lower pivot arm is coupled to an intermediate portion of the vertical support beam 61. Each of the upper and lower sliding pivot arm hinges 77 and 79 is attached to the support member 63 and is free to slide along the length of the support member. Sliding engagement between each of the pivot arm hinges and the support member 63 may be provided by any conventional arrangement such as a track positioned on the generally vertically oriented support member coupled to a complementary engaging member on the end of each of the upper and lower pivot arms 65, 67. A pair of extendable coil springs 62 are coupled between the juncture of each of the first and second intermediate pivot arms 69, 71 and the upper and lower pivot arms 65, 67. The springs 62 bias the collapsible frame to the fully extended configuration as shown in solid line form in FIG. 8. Engagement of the hook seals by the aft periphery of the truck 100, overcomes the tension of the springs 62 and displaces the loading dock shelter 10 toward its support wall 64 as shown in dotted line form in the figure. A pair of building bumpers 68 positioned immediately below the loading dock shelter 10 and mounted to the support wall 64 protect the wall as well as the loading dock from impact with the truck 100. A similar collapsible frame as that just described is also coupled to the left side panel. While the springs 62 are illustrated in FIG. 8 as positioned adjacent to each other, in other embodiments of the invention they may be re-positioned and coupled to other collapsible framework members depending upon the application. For example, if the lower portion of the collapsible framework is subject to greater tension exerted by a vehicle than the upper portion thereof, one of the springs may be re-positioned in a lower portion of the framework and coupled to appropriate framework members. Thus, the springs 62 are not limited to the position and coupling arrangements illustrated in FIG. 8, but may be located virtually anywhere within the collapsible framework depending upon the environment in which the hook seal loading dock shelter is used.

Figure 9:
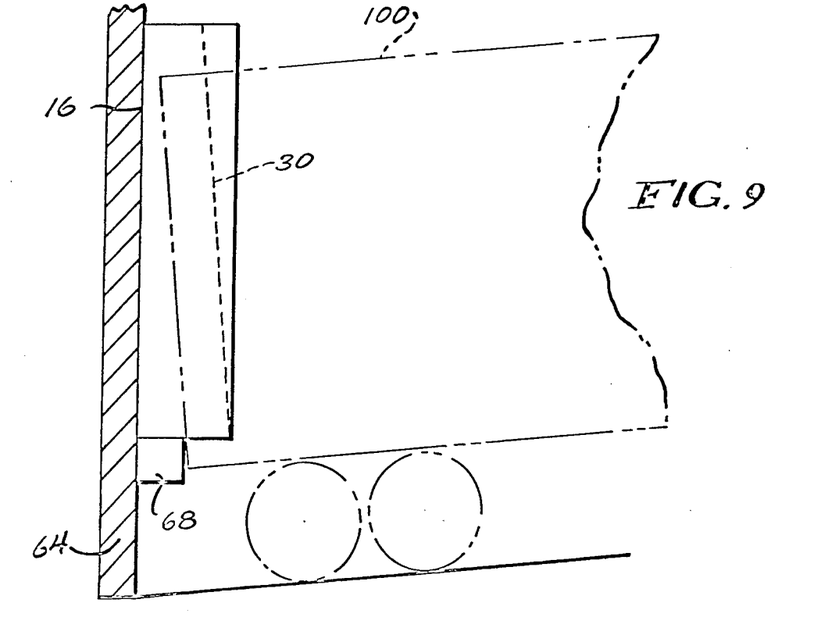
FIGS. 9 and 10 illustrate the manner in which the loading dock shelter with hook seals is capable of engaging in a sealed manner an aft portion of a truck for the case of an inclined and a declined loading dock approach, respectively.
Figure 10:
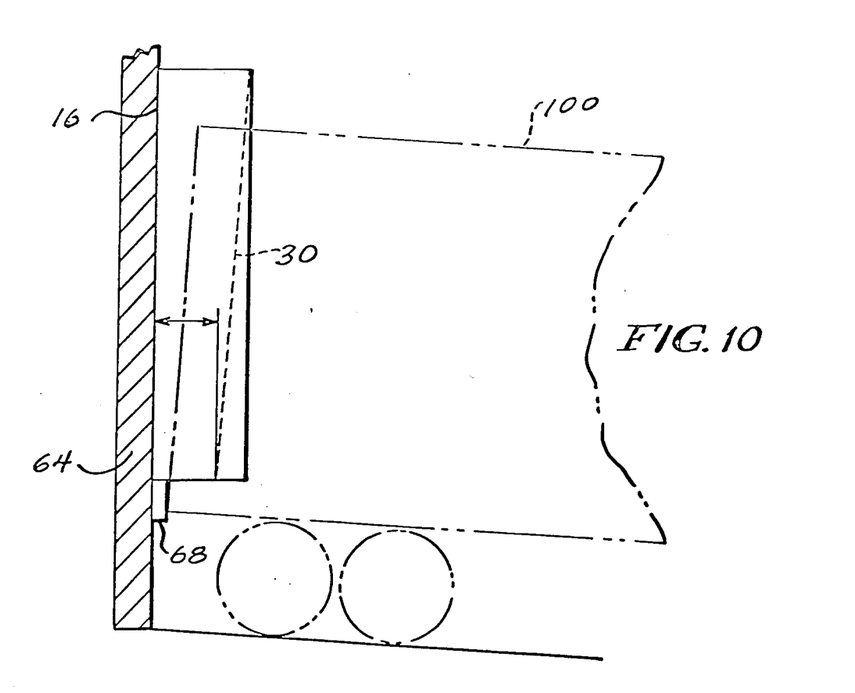

Referring to FIGS. 9 and 10, there are respectively shown the manner in which the loading dock shelter of the present invention is capable of providing sealing engagement with a truck 100 where the loading dock approach is either inclined or declined. As shown in FIG. 9, for an inclined approach to the loading dock, the upper portion of the collapsible support frame is flexed more than the lower portion thereof upon engagement of the hook seals with an aft portion of the truck 100. This occurs for the case of an inclined loading dock approach where the upper portion of the truck 100 is positioned closer to the loading dock shelter's support wall 64 than the lower portion of the truck. Similarly, as shown in FIG. 10 for the case of a declined loading dock approach, a lower portion of the collapsible support frame is flxed more than its upper end portion upon engagement by an aft portion of the truck 100. In both cases, the hook seal portion of the side curtain 30 assumes the orientation of the aft lateral edge of the truck 100 because of the flexibility of the side curtain's reinforcing strips as well as the collapsible nature of its associated side panel support frame. The foam hook seals remain in sealed engagement between the lateral panels and associated hinged doors of the truck and thus provide a seal for this gap.

There has thus been shown a hook seal for a loading dock shelter which provides a sealing engagement with the lateral, aft periphery of a truck using a loading dock for a wide range of truck widths for both declined and inclined loading dock approaches. Each of the left and right hook seals is adapted to engage adjacent, aft edges of the truck's lateral panel and open door coupled by means of a hinge thereto. In this manner, the hook seal of the present invention seals the gap between the truck body and its open door over the full height of the truck during loading/unloading of the truck.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A loading dock shelter for use with a truck having a pair of hinge-mounted swinging doors, said loading dock shelter comprising:
  a head panel and curtain positioned along the top of a doorway in a wall in outwardly projecting relation to said wall;
  left and right side panels positioned adjacent to respective lateral portions of said doorway in outwardly projecting relation to said wall and extending downward from said head panel and curtain;
  left and right side curtains attached to respective distal edge portions of said left and right side panels and extending inwardly toward said doorway;
  left and right resilient biasing means respectively coupled to said left and right side panels for respectively urging and maintaining said left and right side curtains in a fully extended configuration wherein said side curtains are aligned generally parallel with said wall, while allowing said side curtains to bend toward said wall in response to engagement by a truck backed into operative position relative to said doorway for loading or unloading thereof;
  left and right sealing means coupled to respective distal ends of said left and right biasing means for respectively engaging an aft portion of the truck and an adjacent portion of one of its doors when the doors are in an open position in forming a seal between each of the open doors and the truck;
  left and right curtain extensions respectively coupled to said left and right side curtains and respectively disposed about said left and right sealing means in tight fitting relation and in a sealed manner; and
  coupling means for attaching each of said curtain extensions to its associated side curtain and for allowing each of said curtain extensions to be removed from its associated sealing means for facilitating repair or replacement of said sealing means.

2. The loading dock shelter of claim 1 wherein each of said left and right resilient biasing means includes a plurality of reinforcing members disposed in spaced relation along the lengths of said left and right side curtains.

3. The loading dock shelter of claim 2 wherein each of said reinforcing members comprises an elongated, resilient strip.

4. The loading dock shelter of claim 3 wherein each of said side curtains includes a plurality of pockets each extending the width of a side curtain and disposed along the length of a side curtain in spaced relation, wherein each of said pockets is adapted to receive a respective resilient strip.

5. The loading dock shelter of claim 3 wherein each of said elongated, resilient strips is comprised of spring steel.

6. The loading dock shelter of claim 3 wherein each of said elongated, resilient strips is comprised of fiberglass.

7. The loading dock shelter of claim 1 wherein each of said left and right sealing means includes an elongated, resilient, deformable strip.

8. The loading dock shelter of claim 7 wherein said elongated strip is comprised of foam.

9. The loading dock shelter of claim 7 wherein each of said left and right sealing means further includes an angle member having a first portion coupled to said biasing means and a second portion to which said elongated strip is attached.

10. The loading dock shelter of claim 9 wherein the first and second portions of said angle member are oriented generally transversely to one another.

11. The loading dock shelter of claim 7 further comprising curtain extensions disposed about each of said elongated strips in tight fittig relation and in a sealed manner.

12. The loading dock shelter of claim 1 wherein said coupling means includes hook and loops fasteners.

13. The loading dock shelter of claim 1 wherein each of said side panels includes a collapsible frame adapted to collapse toward the wall when contacted by the truck.

14. The loading dock shelter of claim 13 wherein said collapsible frame includes a plurality of pivotally coupled structural members urged to an extended configuration by spring means.

15. A loading dock shelter for use with a truck having a pair of hinge-mounted swinging doors, said loading dock shelter comprising:
  a head panel and curtain positioned along the top of a doorway in a wall in outwardly projecting relation to said wall;
  left and right side panels positioned adjacent to respective lateral portions of said doorway in outwardly projecting relation to said wall and extending downward from said head panel and curtain;
  left and right side curtains attached to respective distal edge portions of said left and right side panels and extending inwardly toward said doorway;
  left and right resilient biasing means respectively coupled to said left and right side panels for respectively urging and maintaining said left and right side curtains in a fully extended configuration wherein said side curtains are aligned generally parallel with said wall, while allowing said side curtains to bend toward said wall in response to engagement by a truck backed into operative position relative to said doorway for loading or unloading thereof; and left and right sealing means coupled to respective distal ends of said left and right biasing means for respectively engaging an aft portion of the truck and an adjacent portion of one of its door when the doors are in an open position in forming a seal between each of the open doors and the truck, wherein each of said sealing means includes an angled portion forming an acute angle with its associated biasing means when not engaged by a truck and wherein said angled portion of said sealing means engages an inner edge of an aft portion of a truck when a truck is backed into operative position relative to said doorway.

16. The loading dock shelter of claim 15 wherein each of said left and right sealing means includes an elongated, resilient, deformable strip.

17. The loading dock shelter of claim 16 wherein said elongated strip is comprised of foam.

18. The loading dock shelter of claim 16 wherein each of said left and right sealing means further includes an angle member having a first portion coupled to said biasing means a second portion to which said elongated strip is attached.

19. The loading dock shelter of claim 18 wherein the first and second portions of said angle member are oriented generally transversely to one another.

* * * * *

UNITED STATES PATENT AND TRADEMARK OFFICE
CERTIFICATE OF CORRECTION

PATENT NO. : 4,805,362

DATED : February 21, 1989

INVENTOR(S) : John A. Frommelt and Floyd D. West

It is certified that error appears in the above-identified patent and that said Letters Patent is hereby corrected as shown below:

Column 5, line 57, "colapsible" should be -- collapsible --.

Column 8, line 36, "fittig" should be -- fitting --.

Column 10, line 11, after "biasing means" insert -- and --.

Signed and Sealed this

Twenty-fifth Day of July, 1989

Attest:

DONALD J. QUIGG

Attesting Officer

Commissioner of Patents and Trademarks